(12) United States Patent
Kawakami et al.

(10) Patent No.: US 7,489,900 B2
(45) Date of Patent: Feb. 10, 2009

(54) COMMUNICATION SYSTEM, COMMUNICATION TERMINAL, AND COMMUNICATION METHOD

(75) Inventors: Daisuke Kawakami, Kanagawa (JP); Akihiro Kikuchi, Chiba (JP); Masatoshi Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 11/135,947

(22) Filed: May 23, 2005

(65) Prior Publication Data

US 2005/0272386 A1    Dec. 8, 2005

(30) Foreign Application Priority Data

Jun. 1, 2004  (JP)  ............... P2004-162898

(51) Int. Cl.
- *H04B 7/00* (2006.01)
- *H04B 1/18* (2006.01)
- *H04M 3/00* (2006.01)
- *H04M 1/00* (2006.01)

(52) U.S. Cl. ............. 455/41.2; 455/41.3; 455/151.2; 455/419; 455/574

(58) Field of Classification Search ............. 455/41.2, 455/41.3, 151.1–151.4, 3.03, 419, 420, 92, 455/13.4, 574, 127.1, 127.5
See application file for complete search history.

(56) References Cited

U.S. PATENT DOCUMENTS 6,073,009 A * 6/2000 van der Tuijn et al. ... 455/422.1

FOREIGN PATENT DOCUMENTS

| JP | 2002-077170 | 3/2002 |
| JP | 2004-007351 | 1/2004 |

OTHER PUBLICATIONS

Office Action issued by the Japanese Patent Office on Jul. 31, 2007 for corresponding Japanese Application No. 2004-162898.

* cited by examiner

*Primary Examiner*—Eugene Yun
(74) *Attorney, Agent, or Firm*—Bell, Boyd & Lloyd LLP

(57) ABSTRACT

Communication systems, communication terminals and communication methods are provided. A communication system has a infrared communication capability and a wireless data communication capability including, a first terminal for storing provisional setting information for wireless data communication containing identification information of the first terminal, and a second terminal having the infrared communication capability and the wireless data communication, wherein the provisional setting information is transmitted from the first terminal to the second terminal by the infrared communication capability, the second terminal generates first setting information with the first terminal specified as a destination of connection on the basis of the received provisional setting information, the second terminal makes wireless data communication with the first terminal on the basis of the first setting information and, if the wireless data communication is successful, transmits a connection completion notice to the first terminal, and the first terminal, having received the connection completion notice, updates the provisional setting information to generate second setting information with the second terminal specified as a destination of connection, thereby establishing wireless data communication between the first terminal and the second terminal.

11 Claims, 12 Drawing Sheets

| TARGET | : | ---.---.---.---:---- | ~51 |
|---|---|---|---|
| IP/PORT | : | 192.168. 1. 58:5000 | ~52 |
| SUBNET MASK | : | 255.255.255. 0 | ~53 |
| MODE | : | Ad hoc | ~54 |
| SSID | : | 0001A2B3CD4E | ~55 |
| WEP KEY | : | XXXXXXXXXXXX | ~56 |

| TARGET | : | 192.168. 1. 58:5000 | ~61 |
|---|---|---|---|
| IP/PORT | : | 192.168. 1. 59:5000 | ~62 |
| SUBNET MASK | : | 255.255.255. 0 | ~63 |
| MODE | : | Ad hoc | ~64 |
| SSID | : | 0001A2B3CD4E | ~65 |
| WEP KEY | : | XXXXXXXXXXXX | ~66 |

FIG. 4A

| HEADER 24BITS | IP ADDRESS 32BITS | PORT 16BITS | MAC ADDRESS 48BITS | WEP 40BITS | FCS 16BITS |
|---|---|---|---|---|---|

FIG. 4B

| HEADER 32BITS | COMMAND CODE 32BITS | USER DATA 0.512 BYTES | FCS 32BITS |
|---|---|---|---|

PRIOR ART

COMMUNICATION SYSTEM, COMMUNICATION TERMINAL, AND COMMUNICATION METHOD

CROSS REFERENCE TO RELATED APPLICATION

This application claims priority to Japanese Patent Document No. 2004-162898, filed on Jun. 1, 2004 with the Japanese Patent Office, which disclosure in its entirety is hereby incorporated by reference.

BACKGROUND

The present invention relates to a communication system, a communication terminal, and a communication method that are included an interface for providing connection between two terminal apparatuses.

In the introduction of a wireless LAN (Local Area Network) into homes, a mode called an ad hoc mode is known that allows direct communication between terminals without an access point, as a minimum configuration. FIG. 12 shows a connection setting for realizing the related-art ad hoc mode.

As shown in FIG. 12A, in order to construct a wireless data communication network connection for two communication terminals (referred to as terminal A and terminal B) on which communication setting has not been established each other, it is required to check the network numbers of the terminals to be interconnected and then execute an input operation for each terminals on the basis of the setting data for example. Namely, as shown in FIG. 12B, it is required to set setting information A to terminal A and setting information B to terminal B.

A communication apparatus having infrared communication unit and radio communication unit for enabling data communication when communication environment changes due to mobility, these units being switched between in accordance with communication line status is disclosed in the Japanese Patent Laid-open No. Hei 10-93508.

Manual execution of connection setting is no easy task because it requires the preparation of setting data, the research into destination terminals, and the knowledge about connection. Manual execution of connection setting also involves a risk of committing a setting error due to an operator's input error for example, resulting in unintentional connection to a wrong communication terminal. In addition, manual entry of a WEP (Wired Equivalent Privacy) key in the encryption of data communication within SSID (Service Set IDentifier) involves a risk of the leakage of confidential information and the inability of communication due to input errors, for example.

SUMMARY

The present invention provides in an embodiment a communication system, a communication terminal, and a communication method that allow the easy setting of communication between terminal apparatuses and the prevention of problems caused by input errors.

According to an embodiment thereof, there is provided a communication system having a infrared communication capability and a wireless data communication capability, including, a first terminal for storing provisional setting information for wireless data communication containing identification information of the first terminal, and a second terminal having the infrared communication capability and the wireless data communication, wherein the provisional setting information is transmitted from the first terminal to the second terminal by the infrared communication capability, the second terminal generates first setting information with the first terminal specified as a destination of connection on the basis of the received provisional setting information, the second terminal makes wireless data communication with the first terminal on the basis of the first setting information and, if the wireless data communication is successful, transmits a connection completion notice to the first terminal, and the first terminal, having received the connection completion notice, updates the provisional setting information to generate second setting information with the second terminal specified as a destination of connection, thereby establishing wireless data communication between the first terminal and the second terminal.

According to another embodiment thereof, there is provided a terminal having an infrared communication capability, a wireless data communication capability, and provisional setting information necessary for wireless data communication including identification information for identifying the terminal, transmitting the provisional setting information to another terminal via the infrared communication capability, receiving, via the wireless data communication, first setting information generated on the basis of the provisional setting information from the another terminal, and updating the provisional setting information on the basis of the received first setting information to generate second setting information with the another terminal specified as a mate of communication, thereby establishing wireless data communication with the another terminal.

According to a further embodiment thereof, there is provided a terminal having an infrared communication capability and a wireless data communication capability, receiving provisional setting information from another terminal via the infrared communication capability, generating first setting information with the another terminal specified as a mate of communication by use of identification information of the another terminal contained in the provisional setting information, and transmitting a connection completion notice to the another terminal via the wireless data communication capability on the basis of the first setting information.

According to yet another embodiment thereof, there is provided a communication method for a communication system having a infrared communication capability and a wireless data communication capability and including a first terminal for storing provisional setting information for wireless data communication containing identification information of the first terminal and a second terminal having the infrared communication capability and the wireless data communication, the communication method including the steps of, transmitting the provisional setting information from the first terminal to the second terminal by the infrared communication capability, generating, by the second terminal, first setting information with the first terminal specified as a destination of connection on the basis of the received provisional setting information, making, by the second terminal, wireless data communication with the first terminal on the basis of the first setting information and, if the wireless data communication is successful, transmitting a connection completion notice to the first terminal, and updating, by the first terminal, having received the connection completion notice, the provisional setting information to generate second setting information with the second terminal specified as a destination of connection, thereby establishing wireless data communication between the first terminal and the second terminal.

As described and according to an embodiment, the wireless data communication terminals not mutually set for connection may be interconnected with ease, thereby preventing human errors from occurring and lowering a risk of external leakage of confidential information. Because the infrared remote control communication standard differs from a maker to another, the possibility of transmission error may be lowered as long as the communication between different models of apparatuses is concerned. Because the data amount of connection setting information is as small as about several tens of bytes, the setting information may be transmitted by means of infrared communication. Instead of infrared communication, a removable storage media, a memory card for example, may be used by recording connection setting information to this memory card and loading the same into a target terminal, however, this method requires a labor and time consuming operation of recording information to a storage medium and involves a risk of leakage of information unless the storage media containing connection information are properly managed. The present invention prevents these problems from occurring because provisional setting information is stored in terminals in advance and the transmission of setting information is executed via infrared communication.

In addition, inclusion of antenna level control information in provisional setting information lowers a risk of leakage of confidential information. Further, the completion of connection at the time of connection setting may be checked with ease. Moreover, because the terminal transmitting connection setting information may only operate at the time of connection, the power consumption may be saved.

Additional features and advantages of the present invention are described in, and will be apparent from, the following Detailed Description and the figures.

BRIEF DESCRIPTION OF THE FIGURES

FIGS. 3A and 3B are diagrams illustrating exemplary provisional setting information and exemplary setting information practiced as one embodiment of the invention.

FIGS. 4A and 4B are diagrams illustrating exemplary transmission packets of provisional setting information and setting information practiced as one embodiment of the invention.

DETAILED DESCRIPTION OF THE INVENTION

The present invention relates to a communication system, a communication terminal, and a communication method that are included an interface for providing connection between two terminal apparatuses.

The following describes embodiments of the present invention with reference to accompanying drawings. Now, referring to FIGS. 1A, 1B, and 1C, there are shown configurations of a communication system practiced as one embodiment of the invention and connection setting procedures. The communication system is based on ad hoc connection made up of a terminal 11 and a terminal 14.

The terminal 11 and the terminal 14 are home servers, television receivers, personal computers (desktop or portable type), PDAs (Personal Digital Assistants), mobile phones, or home remote control commanders having display and input blocks, for example. At least one of the terminal 11 and the terminal 14 is mobile device.

Figure 2:
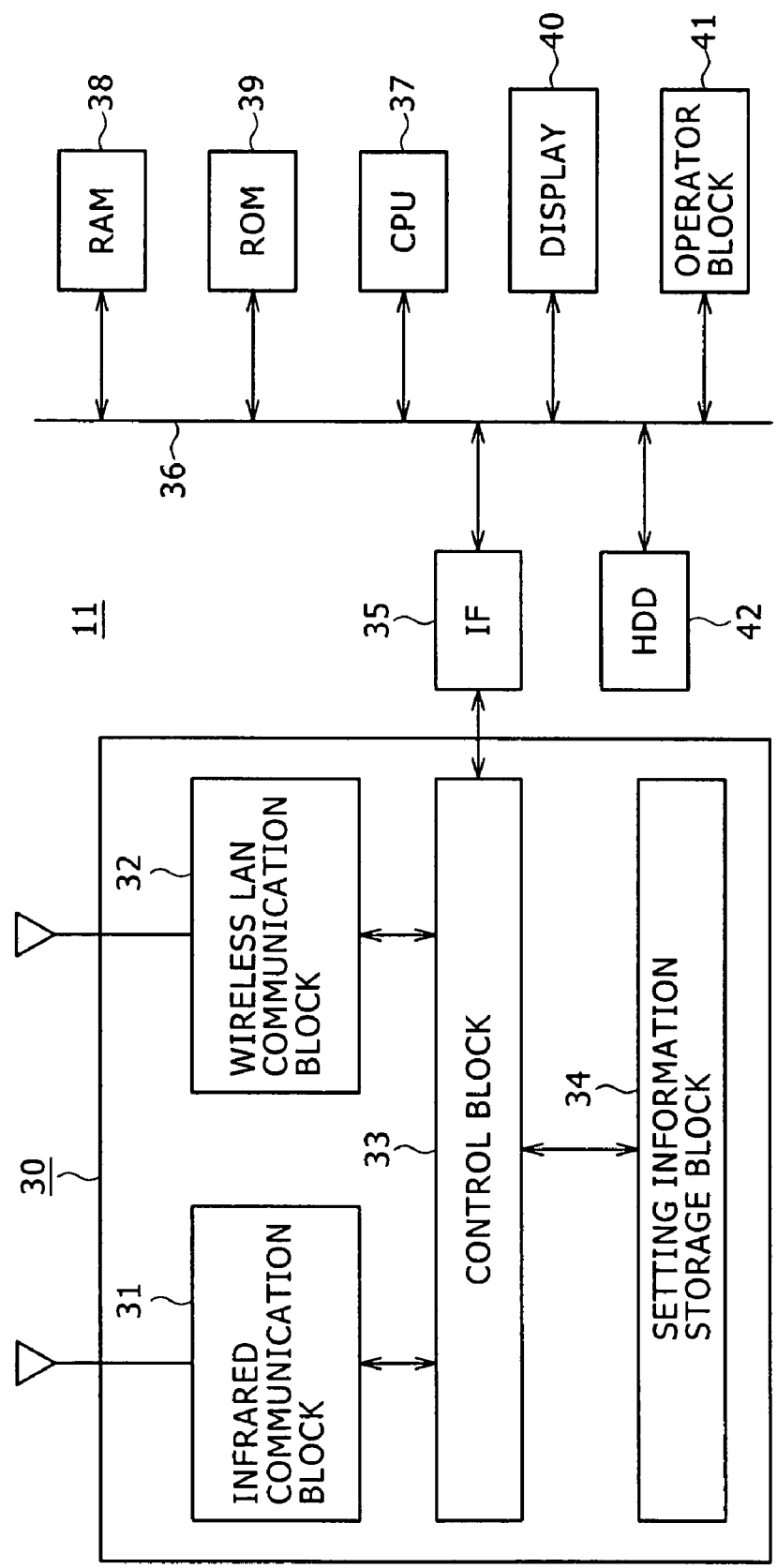
FIG. 2 is a block diagram illustrating an exemplary configuration of a terminal practiced one embodiment of the invention.

Referring to FIG. 2, there is shown an exemplary configuration of the terminal 11. The terminal 11 has a communication block 30 that includes a communication block 31 supporting first wireless data communication requiring no connection setting, infrared communication for example, and a communication block 32 supporting second wireless data communication, wireless LAN, for example. In addition, the communication block 30 has a control block 33 for controlling the communication block 31 and 32 and a setting information storage block 34 for storing network setting information, connection control information, and infrared transmitted/received data, for example. The setting information storage block 34 is based on a nonvolatile memory. The setting information storage block 34 is capable of storing wireless LAN connection setting information and connection control information and these piece of information may be read from the setting information storage block 34 as required.

Infrared communication is a unidirectional or bidirectional communication based on infrared radiation. For example, SIRCS (Standard Code for Infrared Remote Control System) or IrDA (Infrared Data Association) that is a remote control communication standard is available for this infrared communication. Wireless LAN is radio-based bidirectional communication. For example, IEEE (Institute of Electrical and Electronics Engineers) 802.11a, IEEE 802.11b, IEEE 802.11g, or Bluetooth is available for this wireless LAN.

The communication block 30 is connected to a CPU (Central Processing Unit) bus 36 via an interface 35. The CPU bus 36 is the bus for a CPU 37 and is also connected to a RAM 38 for data storage, a ROM 39 for program storage, a display 40 based on LCD for example, an operator block 41, and a hard disk drive 42. The CPU 37 communicates with the control block 33 in the communication block 30 to control the communication block 30. The operator block 41 may be a GUI (Graphical User Interface) having inputs device such as a touch panel in addition to mechanical keys, switches, and other controls. The communication block 30, the CPU 37, and so on make up each digital device, such as a PDA.

The terminal 14 and the terminal 11 are substantially the same in configuration. In setting connection information, the terminal 11 and the terminal 14 are located within a range in which infrared communication is enabled. However, after the completion of connection setting, the terminal 11 and the terminal 14 may be arranged separately from each other within a range in which wireless LAN communication is enabled.

Figure 1A:
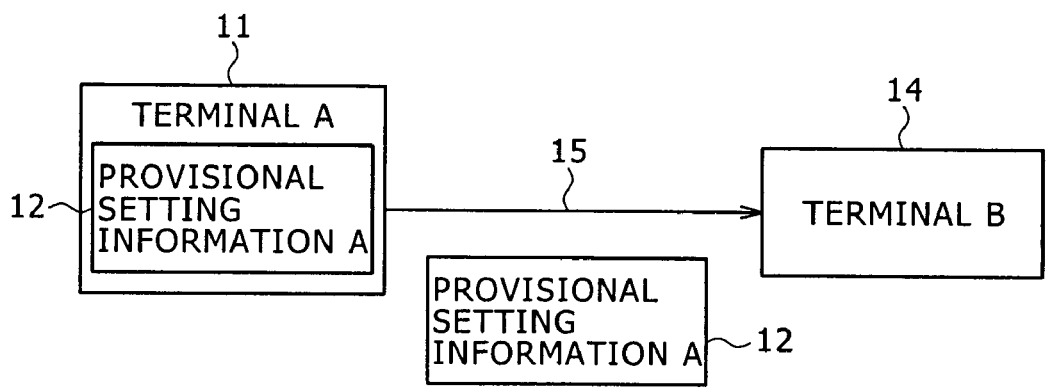
FIGS. 1A, 1B, and 1C are block diagrams illustrating, in the order of connection setting procedures, an approximate configuration of a communication system practiced as one embodiment of the invention.

As shown in FIG. 1A, provisional setting information 12 is stored in the setting information storage block 34 of the terminal 11 in advance. The provisional setting information 12 contains the connection setting information necessary for wireless data communication connection. However, because the provisional setting information has no identification information, a number for example, for identifying a destination terminal, network connection cannot be provided between the terminal 11 and the terminal 14 in this state.

The provisional setting information 12 is transmitted to the terminal 14 via infrared communication 15. Infrared communication allows the user to execute a transmission operation such as pressing a button with infrared directed toward the terminal 14, thereby transmitting provisional setting information to the terminal 14. The user needs to execute the manual operation only for the first transmission operation, subsequent operations being automatically executed by programs stored in the terminal 11 and the terminal 14. The terminal 14 is always in an infrared communication receiving state, being ready for a reception event transmitted from the terminal 11. After the completion of wireless data communication network connection, the terminal 14 need not be in the infrared receiving state.

Figure 1B:
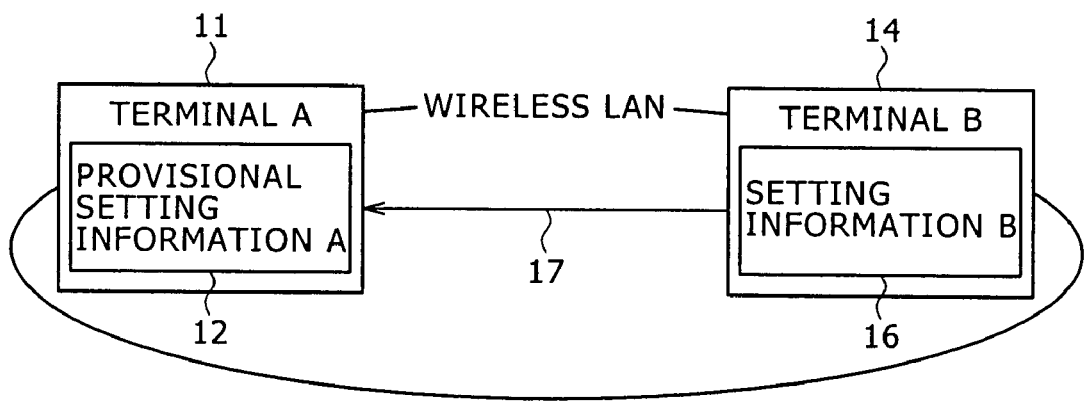

The terminal 14 stores the received provisional setting information into its memory. As shown in FIG. 1B, the terminal 14 generates setting information 16 through the control block (refer to FIG. 2) as first setting information for the wireless LAN connection with the terminal 11 and stores the generated setting information 16 in the storage block. The terminal 14 has a capability of attempting the connection by the setting information 16. In addition, the terminal 14 transmits a connection completion notice to the terminal 11 via a wireless LAN 17 after the completion of connection. This completion notice includes the identification information for identifying the destination of transmission (namely the terminal 14).

The terminal 11 is always in the state of waiting for the reception of the connection completion notice from the terminal 14 that is the information for allowing wireless LAN connection, after infrared communication. In this case, restricting the duration of the connection completion notice wait state of the terminal 11 to a certain time saves the wasted dissipation of the standby power of the terminal 11.

Figure 1C:
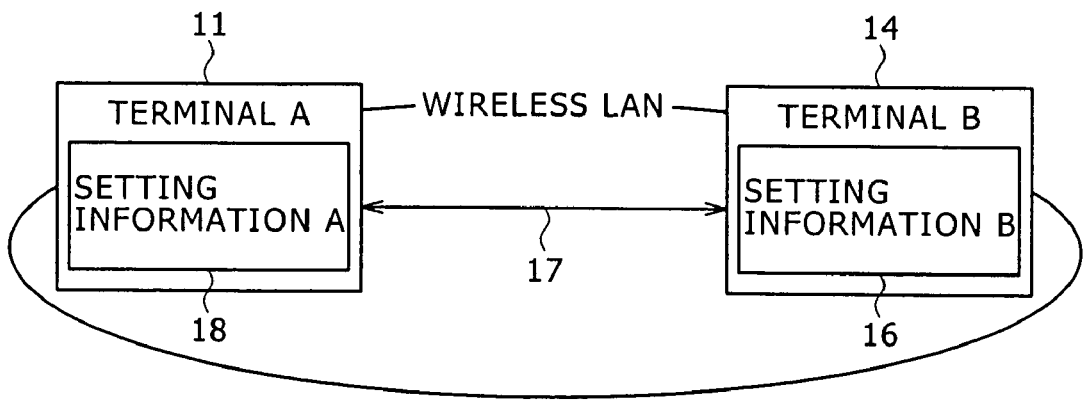

As shown in FIG. 1C, when the terminal 11 receives a connection completion notice from the terminal 14, the terminal 11 updates the provisional setting information 12 so as to specify the terminal 14 as the destination of connection because the terminal number of the terminal 14 is contained in the received notice. Consequently, the terminal 11 comes to have setting information 18 that is second setting information obtained from the update operation. In this state, the terminal 11 and the terminal 14 are bidirectionally network connected with each other in a wireless LAN communicable manner. Once storing the connection setting in both the terminal 11 and the terminal 14 allows the execution of wireless LAN communication after clearing the network connection without executing infrared communication again.

As shown in FIG. 3A, the provisional setting information 12 contains information represented in numerical values and hexadecimal notation. A "Target" 51 is the IP address of an opposite party of the terminal 11. Because the provisional setting information 12 does not identify the destination of connection, the value of "Target" 51 is represented in a meaningless sequence of numbers, all 0's for example. "IP/Port" 52 and "Subnet Mask" 53 are numbers allowing the identification between the terminals, indicative that a private IP address and a subnet mask are allocated to each terminal by use of class C (192.168.xxx.xxx). Referring to FIG. 3A, the IP address and subnet mask of the terminal 11 are allocated. However, this allocation need not be made if the connection within a group or with the outside by access point connection is supposed.

For example, allocating a MAC (Media Access Control) address unique to wireless data communication device to "SSID" 55 representative of the group name of a wireless LAN allows the prevention of the contention between networks in advance. "Mode" 54 is indicative of the ad hoc mode or the infrastructure mode. "WEP Key" 56 may be designed so as to be automatically generated by the terminal and specified by the user as required, thereby lowering the risk of private key interception.

Receiving the provisional setting information 12 shown in FIG. 3A via infrared communication, the terminal 14 automatically generates setting information 16 shown in FIG. 3B and stores the generated setting information in the storage block. Like the provisional setting information 12, the setting information 16 contains items "Target" 61, "IP/Port" 62, "Subnet Mask" 63, "Mode" 64, "SSID" 65, and "WEP Key" 66.

As seen from the comparison between FIG. 3A and FIG. 3B, the IP address (192.168.1.58:5000) of the terminal 11 is set as "Target" 61 in the setting information 16. For "IP/Port" 62, and "Subnet Mask" 63, the IP address and subnet mask of its own (the terminal 14) are allocated.

It should be noted that the provisional setting information 12 to be transmitted from the terminal 11 to the terminal 14 may contain the information about antenna output level control as connection control information. This information allows the setting of a relatively large antenna level of the terminal 14 by supposing the communication of a relatively large distance or a relatively small antenna level for the use only within a limited space.

FIG. 4A shows an exemplary configuration of a data packet that is used when the terminal 11 transmits the provisional setting information 12 (FIG. 3A) to the terminal 14 via the infrared communication 15. In this configuration, "IP/Port" 52, "SSID" 55, and "WEP Key" 56 in the provisional setting information 12 may be transmitted. One packet is 176 bits (22 bytes) wide, starting with a header (24 bits). The header includes the maker code and category code for example necessary for infrared remote control communication. Thus, the provisional setting information may be transmitted by the infrared remote control standard because the data amount of this information is only several tens of bytes.

The header is followed by IP address (32 bits) and port (16 bits) corresponding to "IP/Port" 52, MAC address (48 bits) corresponding to "SSID" 55, and WEP (40 bits) corresponding to "WEP Key" 56. Each packet ends with FCS (Frame Check Sequence) (16 bits) that is CRC (Cyclic Redundancy Code) information necessary for error detection from header to WEP. For the transmission data, numeric values or a hexadecimal number sequence may be transmitted as they are or the binary equivalent may be transmitted.

As shown in FIG. 4B, the wireless LAN communication between the terminal 11 and the terminal 14 is executed on the basis of packet structure of TCP (Transmission Control Protocol) or UDP (User Datagram Protocol) for example. Each packet starts with a header (32 bits). In UDP, the header information includes source port (16 bits), destination port (16 bits), length (16 bits), and checksum (16 bits). In TCP, 48-bit information including a window size is added to the above-mentioned items of UDP.

The header is followed by a command code (32 bits) as control information and user data of variable length (0 to 512 bytes). Each packet ends with FCS (32 bits) that is CRC information for error detection from header to user data.

Figure 5:
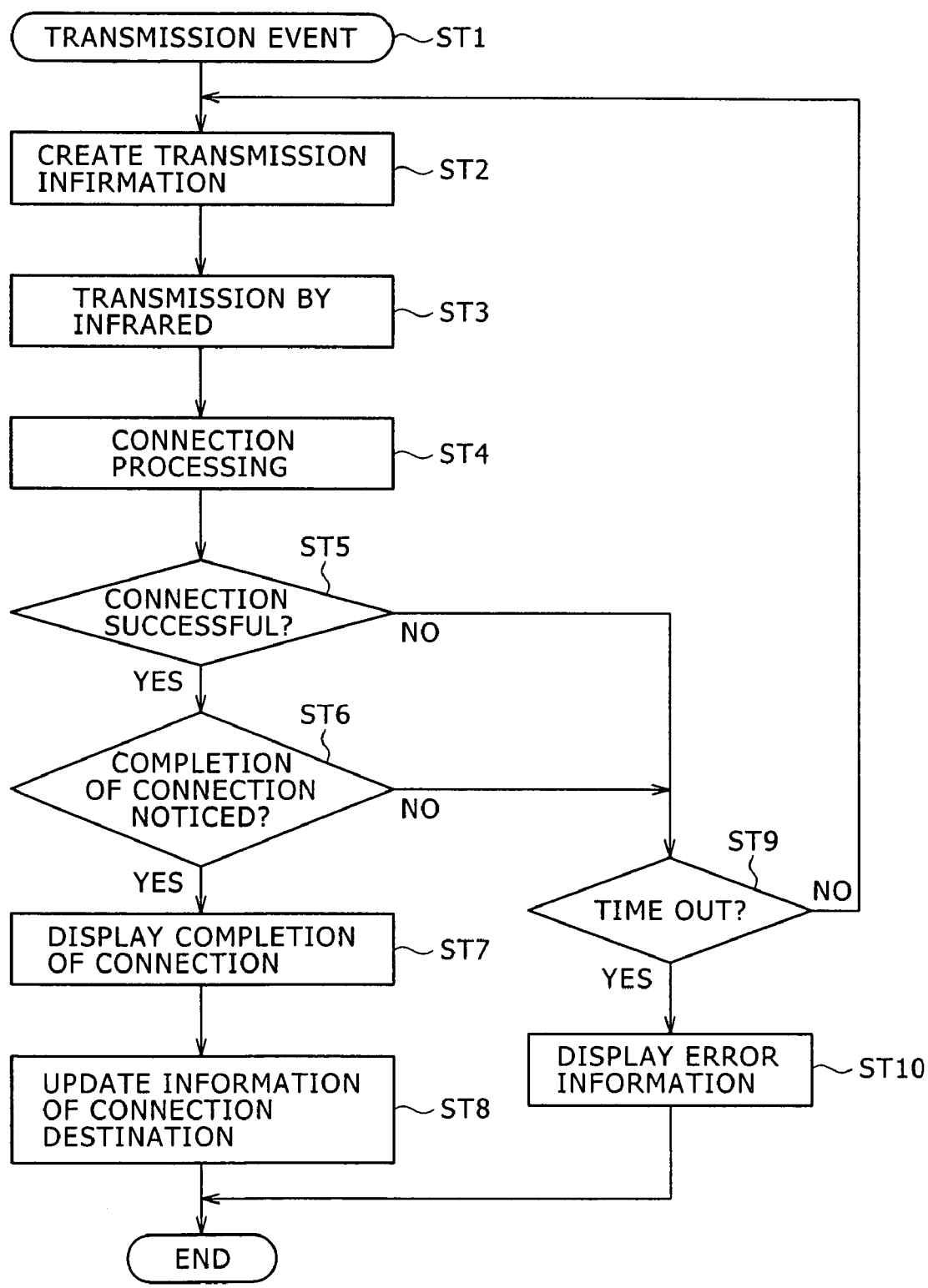
FIG. 5 is a flowchart indicative of the processing of connection setting on one terminal practiced as one embodiment of the invention.
Figure 6:
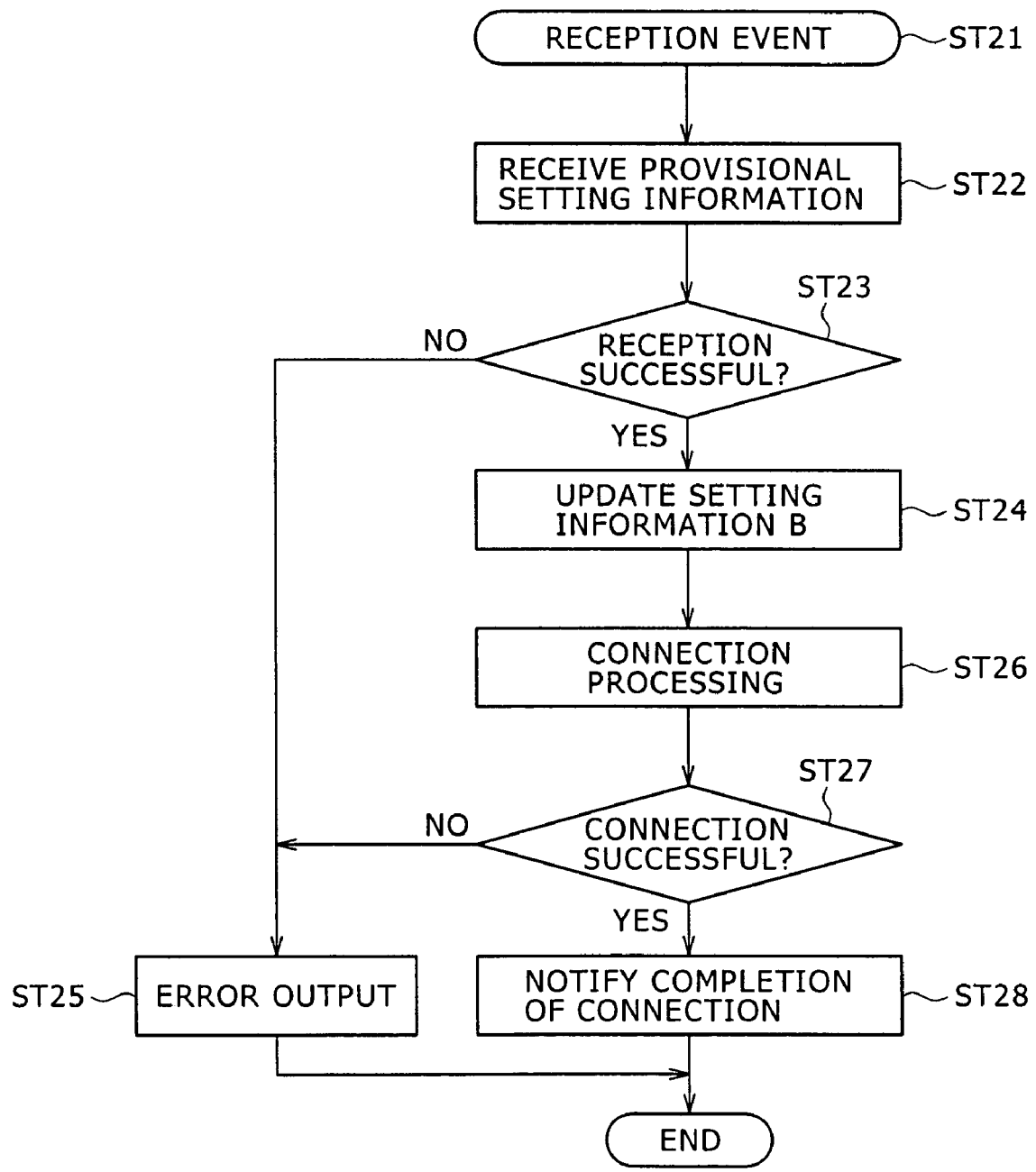
FIG. 6 is a flowchart indicative of the processing of connection setting on the other terminal practiced as one embodiment of the invention.

FIG. 5 is a flowchart indicative of the processing by the terminal 11 to execute network-connection with the terminal 14. FIG. 6 is a flowchart indicative of the processing by the terminal 14 to execute network connection with the terminal 11.

When the user presses a setting transmit button on the terminal 11, a transmission event occurs (step ST1), upon which the transmission information for infrared transmission is generated on the basis of the provisional setting information 12 (step ST2). In step ST3, the generated transmission information is transmitted to the terminal 14.

In step ST4, the connection processing of the terminal 11 itself is executed for wireless LAN connection. In step ST5, it is determined whether the connection with the terminal 14 is successful. If the connection is found successful in step ST5, then a response from the terminal 14 is waited for in step ST6. If a connection completion notice is found received from the terminal 14 in step ST6, then the procedure goes to step ST7, in which the completion of connection is displayed. In step ST8, connection destination information is updated. Namely, the provisional setting information 12 is updated to setting information 18, upon which the processing ends.

If the connection is found unsuccessful in step ST5 and no connection completion notice is found in step ST6, then it is determined in step ST9 whether time-out has been reached. During a predetermined time before time-out, the infrared transmission processing from step ST2 to step ST6 is repeated. If time-out is found in step ST9, then error information display is executed, namely message "Connection Failed" for example is displayed in step ST10, upon which the processing ends.

Figure 7:
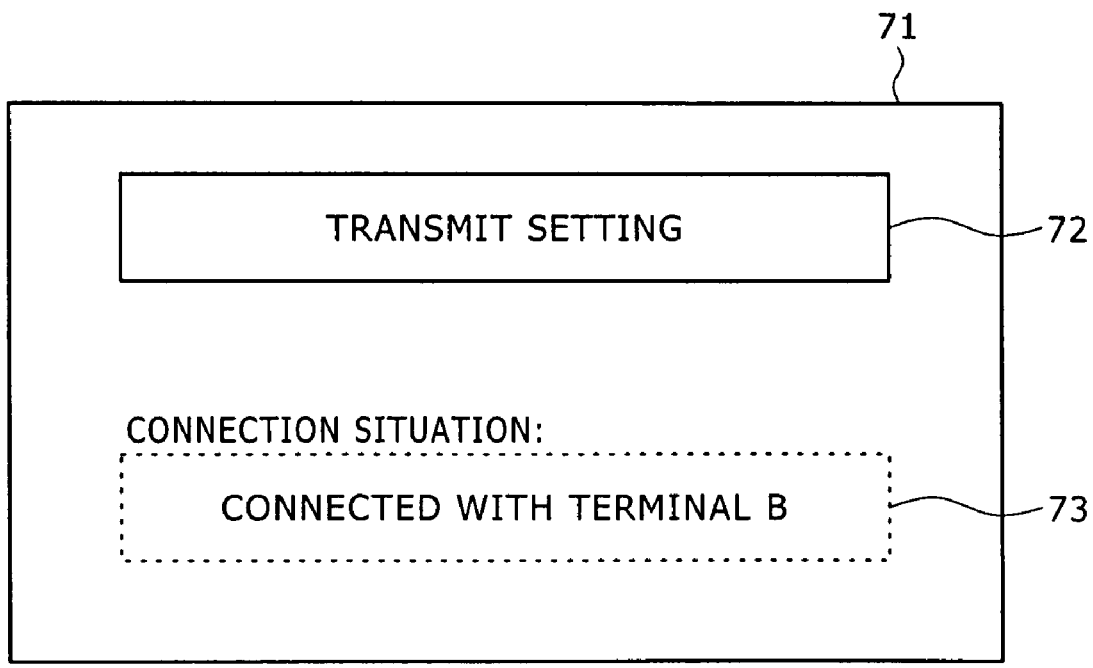
FIG. 7 is a diagram illustrating a display screen of one terminal practiced as one embodiment of the invention.

Reference numeral 71 in FIG. 7 denotes a display screen of the terminal 11. Reference numeral 72 denotes a transmit button. The display is based on a touch panel. The transmit button 72 is pressed by the finger on the panel or specified by the cursor and the enter button is pressed. When the transmit button 72 is pressed, the transmission event of step ST1 is generated.

When the transmit button 72 is pressed, a display 73 indicative of connection situation is substantially not shown; namely, the display 73 is not focused or highlighted. When the completion of connection is displayed in step ST7, the display 73 indicative of connection situation is executed (for example, message "Connected with Terminal B" is displayed). This display 73 indicates that the wireless LAN connection with the terminal 14 has been completed. The completion of connection is displayed by flashing a light emitting diode for example or outputting a sound in addition to the above-mentioned messaging.

The following describes the processing to be executed by the terminal 14 with reference to FIG. 6. Step ST21 denotes an infrared reception wait state. In step ST22, the provisional setting information 12 is received from the terminal 11. In step ST23, it is determined by checking the contents of the reception whether the provisional setting information 12 has been received successfully.

If the reception is found successful in step ST23, then the setting information 16 is updated (FIG. 3B) in step ST24. If the reception is found unsuccessful in step ST23, then error output processing is executed in step ST24.

In step ST26 after step ST24, wireless LAN connection with the terminal 11 is executed on the basis of the setting information 16. In step ST27, it is determined whether the connection is successful or not. If the connection is found successful, then a connection completion notice is transmitted to the terminal 11 in step ST28. If the connection is found unsuccessful in step ST27, then error output processing of step ST25 is executed. As described above, when the terminal 11 updates the connection destination information to generate setting information 18, wireless LAN connection is established between the terminal 11 and the terminal 14.

Figure 8:
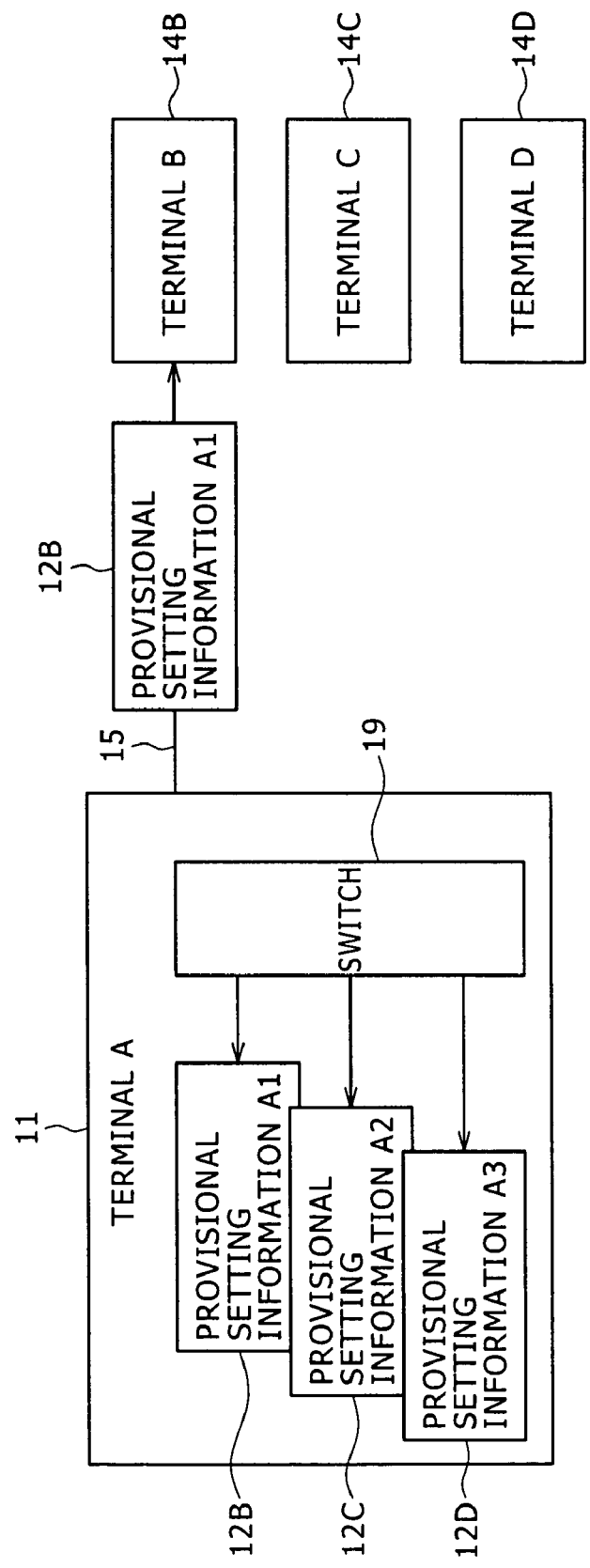
FIG. 8 is a block diagram illustrating a communication system for providing connection with a plurality of terminals.

As shown in FIG. 8, the present invention may also configure a communication system in which the terminal 11 is connected to a plurality of terminals 14, terminals 14B, 14C, and 14D for example. The terminal 11 manages provisional information 12B, 12C, and 12D separately stored in the storage block (refer to FIG. 2). The provisional information 12B, 12C, and 12D correspond to the terminals 14B, 14C, and 14D respectively. The terminal 11 has a switch 19 for the user to select between the destinations of connection. The switch 19 may be either a mechanical switch (a pushbutton switch for example) or an electronic switch (a touch panel for example).

The selections of destination terminals by the switch 19 correspond to the setting information 12B, 12C, and 12D respectively. Operating the switch 19 reads the setting information corresponding to each selected destination of connection from the storage block.

For example, when connecting the terminal 11 and the terminal 14B by wireless LAN, provisional setting information 12B is read from the storage block by operating the switch 19 and the setting information 12B is transmitted to the terminal 14B via the infrared communication 15. Subsequently, the terminal 11 and the terminal 14B may be connected by wireless LAN in the same procedure as that of connecting two terminals by wireless LAN described above.

Figure 9:
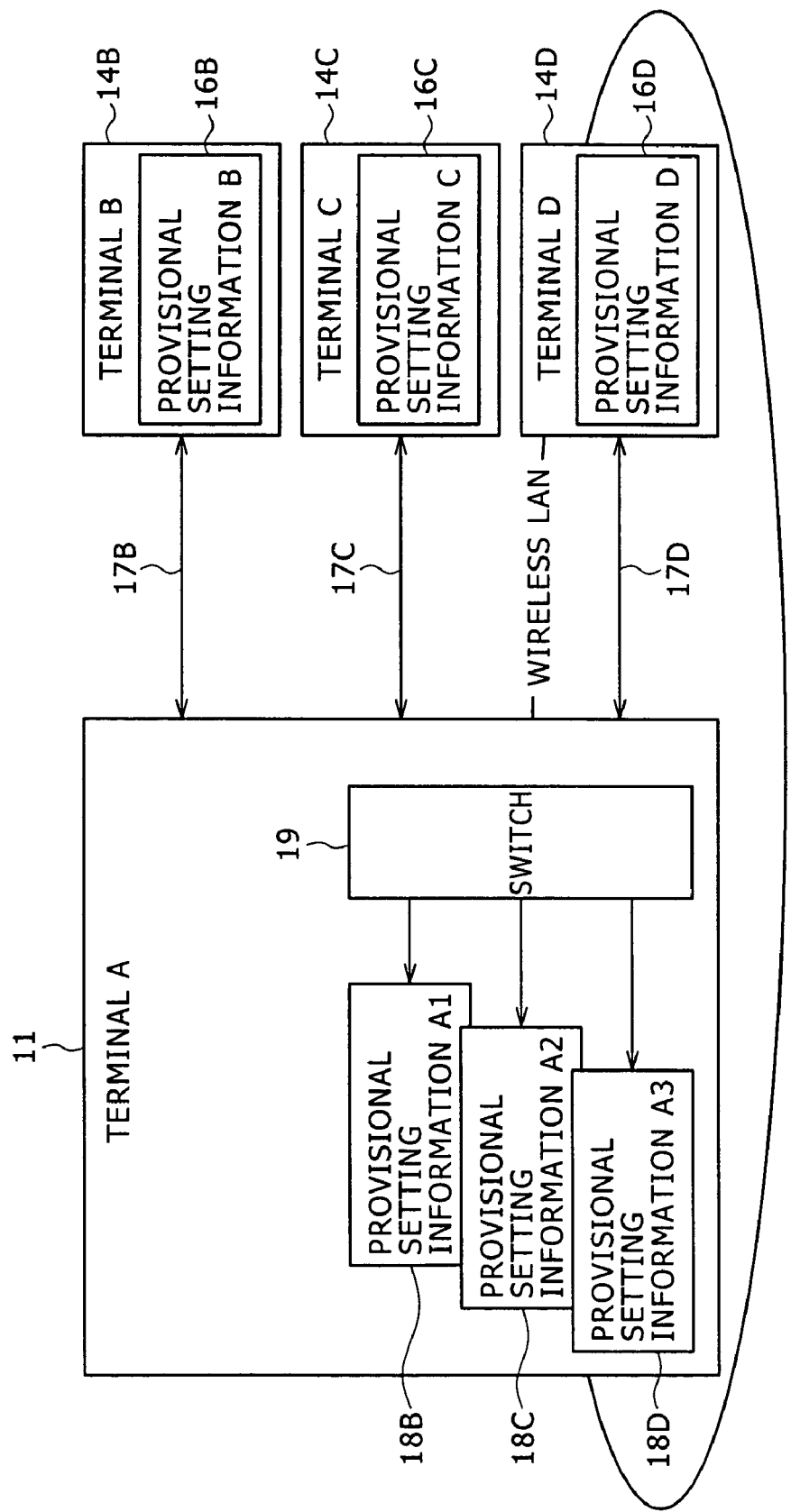
FIG. 9 is a block diagram illustrating a communication system for providing connection with a plurality of terminals.

Namely, the terminal 14B that has received provisional setting information 12B updates setting information, transmits the updated setting information to the terminal 11 via wireless LAN, and the terminal 11 updates the provisional setting information 12B to generate setting information, upon which bidirectional wireless LAN connection is established between these terminals. Next, the switch 19 is operated to read provisional setting information 12C from the storage block, thereby establishing wireless LAN connection between the terminal 11 and the terminal 14C in the same manner as with the terminal 14B. Further, the switch 19 is operated to read provisional setting information 12D from the storage block, thereby establishing wireless LAN connection between the terminal 11 and the terminal 14D in the same manner as with the terminals 14B and 14C. As a result, the terminal 11 comes to have setting information 18B, 18C, and 18D obtained by updating provisional setting information 12B, 12C, and 12D. FIG. 9 shows a state in which bidirectional wireless LAN connections 17B, 17C, and 17D are established between the terminal 11 and the three terminals 14B, 14C, and 14D respectively.

Network numbers may be allocated to the terminal 11 and the three terminals 14B, 14C, and 14D so that there will be no contention therebetween on the basis of the provisional setting information 12B, 12C, and 12D of the terminal 11. However, there is a possibility of contention in number between the terminals 14B, 14C, and 14D. In order to prevent this possibility from occurring, there is available a method in which the contents (or a value) of "WEP Key" 66 (refer to FIG. 3B) are changed for each connection. If there occurs contention between network numbers within the same SSID, only the terminals having a common cryptographic key may communicate with each other, thereby removing a risk of erroneously communicating any terminals having a different key.

Figure 10:
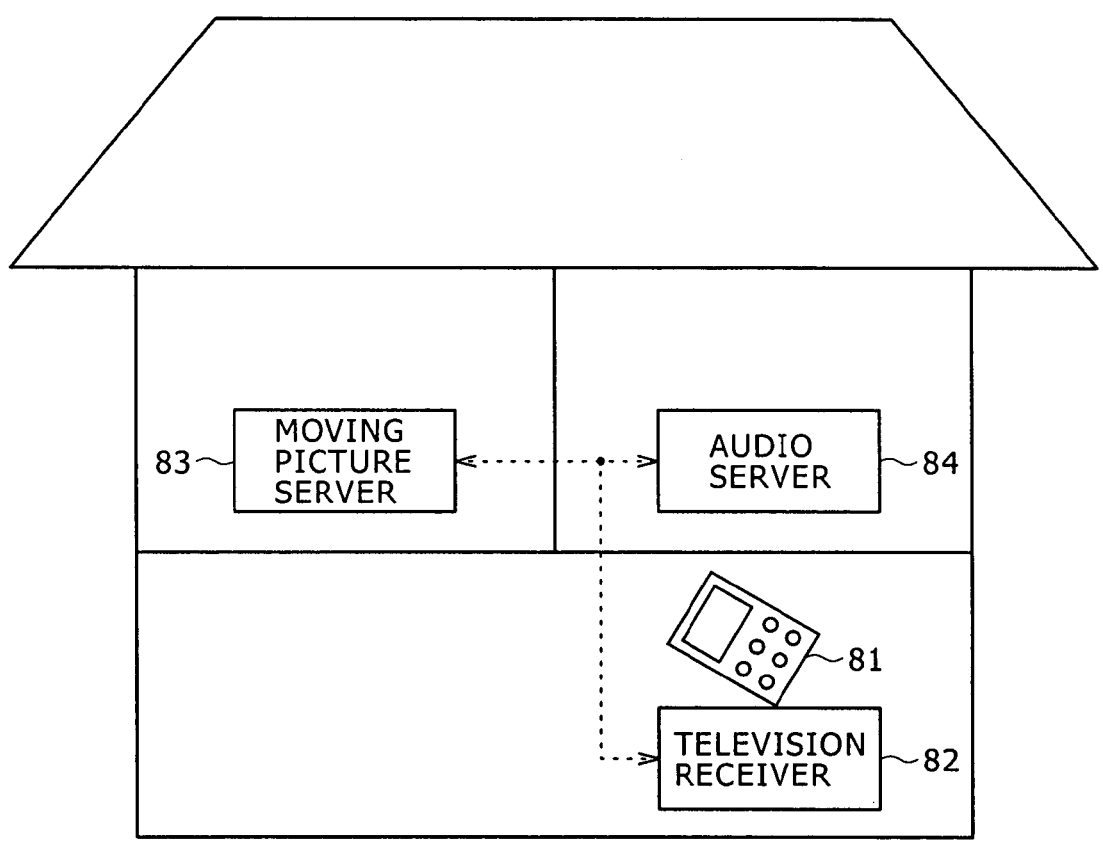
FIG. 10 is a block diagram illustrating a specific example of a communication system for providing connection with a plurality of terminals.

FIG. 10 shows an approximate configuration of a communication system with the wireless communication system shown in FIG. 9 applied to a home LAN. Reference numeral 81 denotes a commander for remote control, which has a display device. A television receiver 82, a moving image server 83, and an audio server 84 are arranged in different rooms of a home. The television receiver 82 is capable of receiving data from each server and reproducing the received data.

The commander 81 is equivalent to the terminal 11 and the television receiver 82, the moving image server 83, and the audio server 84 are equivalent to the terminals 14B, 14C, and 14D respectively. The commander 81, the television receiver 82, the moving image server 83, and the audio server 84 have each a communication apparatus based on infrared communication and wireless LAN communication. As described above, the user takes the commander 81 to each room to connect with the device arranged in that room by means of infrared communication.

When wireless LAN connection has been established between the commander 81 and the television receiver 82, the moving image server 83, and the audio server 84, it becomes practicable to operate the commander 81 in the room in which the television receiver is arranged, thereby transmitting desired data from desired one of the servers to the television receiver 82 to reproduce the data. In this case, the data from each server is transmitted via any one of the established wireless LAN connection or the wired LAN connection.

Figure 11:
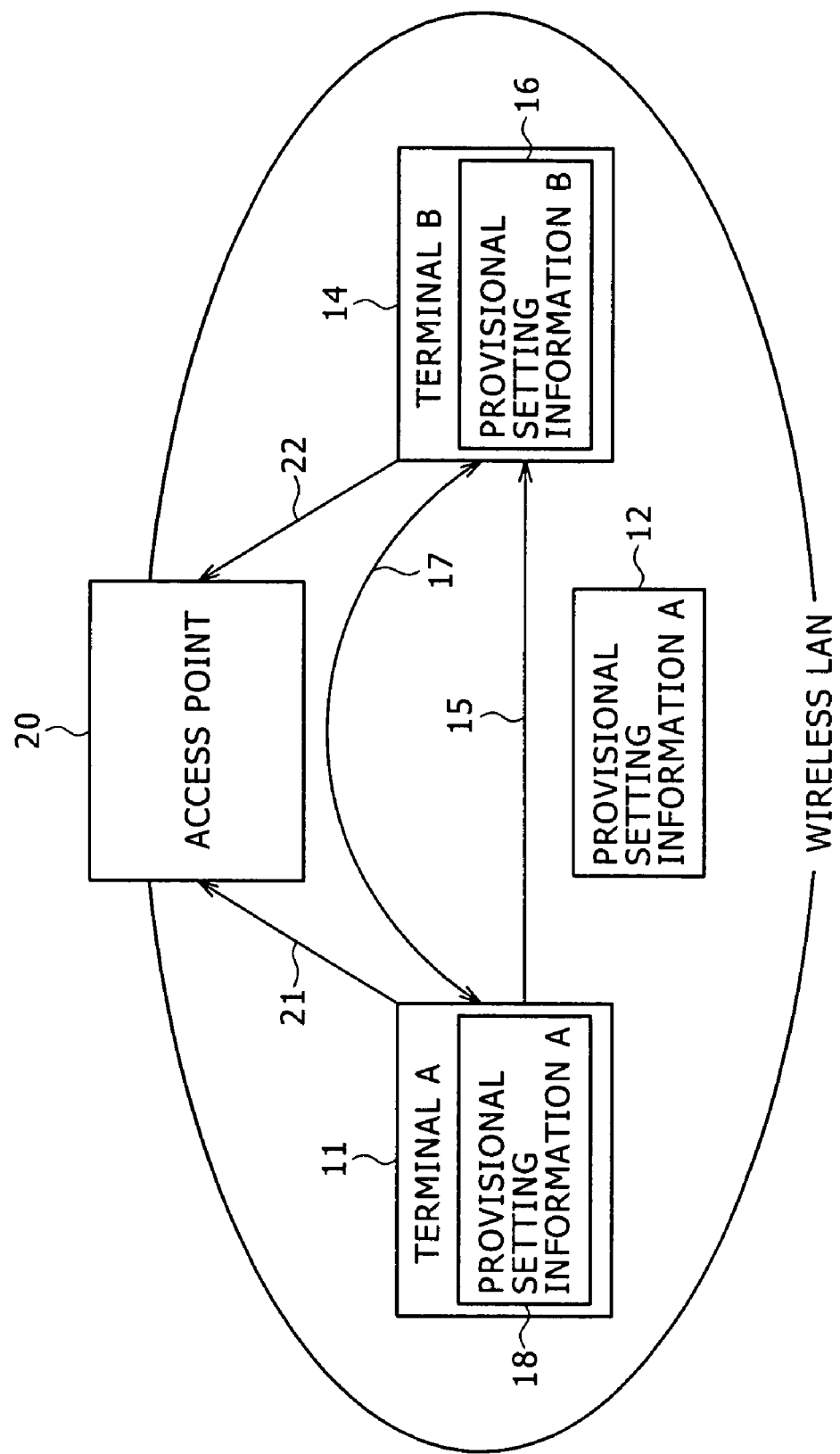
FIG. 11 is a block diagram illustrating an exemplary configuration with the present invention applied in the case where communication is executed via an access point.
Figure 12A:
FIGS. 12A and 12B are block diagrams illustrating connection setting methods in related-art communication systems.
Figure 12B:
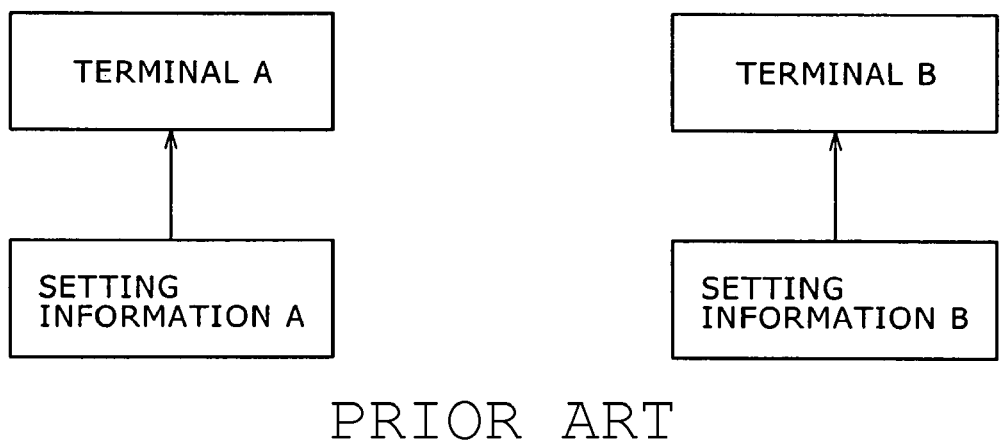

It should be noted that FIG. 1 shows an example of ad hoc connection however, it is also practicable for the present invention to configure a communication system based on an infrastructure mode using an access point 20 as shown in FIG. 11. In this case, first, the provisional setting information 12 is transmitted to the terminal 14 via infrared communication 15. After the infrared communication by the provisional setting information 12 by the terminal 11, connection 21 is made between the terminal 11 and the access point 20. Receiving the provisional setting information 12, the terminal 14 makes connection 22 with the access point 20. After the completion of the connection, the terminal 11 and the terminal 14 become enabled to communicate each other via the access point 20.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A communication system having an infrared communication capability and a wireless data communication capability, comprising:
    a first terminal for storing provisional setting information for wireless data communication containing identification information of said first terminal, the provisional setting information including antenna level control information; and
    a second terminal having said infrared communication capability and said wireless data communication;
    wherein said provisional setting information is transmitted from said first terminal to said second terminal by said infrared communication capability,
    said second terminal generates first setting information with said first terminal specified as a destination of connection on the basis of said received provisional setting information,
    said second terminal makes wireless data communication with said first terminal on the basis of said first setting information and, if said wireless data communication is successful, transmits a connection completion notice to said first terminal, and
    said first terminal, having received said connection completion notice, updates said provisional setting information to generate second setting information with said second terminal specified as a destination of connection, thereby establishing wireless data communication between said first terminal and said second terminal, and said first terminal having not received said connection completion notice within a time frame, suspends a wait state and reduces the use of standby power.

2. The communication system according to claim 1, wherein said infrared communication capability is unidirectional communication.

3. The communication system according to claim 1, wherein said first terminal has a plurality of pieces of provisional setting information necessary for wireless data communication connection with a plurality of said second terminals and selection means for selecting one of said plurality of pieces of setting information.

4. The communication system according to claim 3, wherein said plurality of pieces of setting information contain different pieces of encryption key information.

5. The communication system according to claim 1, wherein said provisional setting information contains information for specifying one of an ad hoc mode and an infrastructure mode.

6. The communication system according to claim 1, wherein said first terminal has a plurality of pieces of provisional setting information necessary for wireless data communication connection with a plurality of said second terminals and a selector for selecting one of said plurality of pieces of setting information.

7. The communication system according to claim 1, the first terminal comprising a display, and wherein the first terminal, having received the connection completion notice, indicates completion of connection on the display.

8. A terminal comprising an infrared communication capability, a wireless data communication capability, and provisional setting information necessary for wireless data communication including identification information for identifying said terminal, the provisional setting information including antenna level control information,
    wherein said provisional setting information is transmitted to another terminal via said infrared communication capability,
    wherein, via said wireless data communication, first setting information generated based on said provisional setting information is received from said another terminal,
    wherein, if the first setting information is not received from said another terminal within a time frame, a wait state is suspended and standby power is reduced, and
    wherein said provisional setting information based on said received first setting information is updated to generate second setting information with said another terminal specified as a mate of communication, thereby establishing wireless data communication with said another terminal.

9. The terminal according to claim 8, the terminal comprising a display, and wherein the terminal indicates completion of connection with the another terminal on the display.

10. A communication method for a communication system having a infrared communication capability and a wireless data communication capability and comprising a first terminal for storing provisional setting information for wireless data communication containing identification information of said first terminal and a second terminal having said infrared communication capability and said wireless data communication, said communication method comprising:

transmitting said provisional setting information from said first terminal to said second terminal by said infrared communication capability, the provisional setting information including antenna level control information;

generating, by said second terminal, first setting information with said first terminal specified as a destination of connection based on said received provisional setting information;

making, by said second terminal, wireless data communication with said first terminal based on said first setting information and, if said wireless data communication is successful, transmitting a connection completion notice to said first terminal;

updating, by said first terminal, having received said connection completion notice, said provisional setting information to generate second setting information with said second terminal specified as a destination of connection, thereby establishing wireless data communication between said first terminal and said second terminal; and suspending, by said first terminal, having not received said connection completion notice within a time frame, the wait state and reducing the use of standby power.

11. The communication method according to claim 10, the first terminal comprising a display, and wherein the first terminal, having received the connection completion notice, indicates completion of connection on the display.

* * * * *